(12) United States Patent
Yoo et al.

(10) Patent No.: US 10,839,729 B2
(45) Date of Patent: Nov. 17, 2020

(54) APPARATUS FOR TESTING DISPLAY PANEL AND DRIVING METHOD THEREOF

(71) Applicant: Samsung Display Co., Ltd., Yongin-si (KR)

(72) Inventors: Hyun Seuk Yoo, Yongin-si (KR); Hyung Jin Kim, Yongin-si (KR); Hye Sang Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/209,727

(22) Filed: Dec. 4, 2018

(65) Prior Publication Data
US 2020/0005691 A1    Jan. 2, 2020

(30) Foreign Application Priority Data
Jun. 27, 2018  (KR) .................. 10-2018-0073908

(51) Int. Cl.
*G09G 3/00* (2006.01)
*G09G 3/20* (2006.01)
*G02B 27/01* (2006.01)

(52) U.S. Cl.
CPC ........... *G09G 3/006* (2013.01); *G02B 27/017* (2013.01); *G09G 3/20* (2013.01); *G02B 2027/014* (2013.01); *G09G 2320/029* (2013.01); *G09G 2320/0233* (2013.01)

(58) Field of Classification Search
CPC .... G09G 3/006; G09G 3/20; G09G 2320/029; G09G 2320/0233; G02B 27/017; G02B 2027/014
See application file for complete search history.

(56) References Cited

U.S. PATENT DOCUMENTS

| | | | |
|---|---|---|---|
| 2015/0116387 A1* | 4/2015 | Jun | .................. G09G 3/20 345/694 |
| 2015/0287350 A1* | 10/2015 | Jun | .................. G09G 3/006 345/690 |
| 2017/0116904 A1* | 4/2017 | Jun | .................. G09G 3/2007 |
| 2017/0169793 A1* | 6/2017 | Kim | .................. G02B 27/0172 |
| 2017/0328703 A1* | 11/2017 | Dun | .................. H04N 13/327 |
| 2018/0103245 A1 | 4/2018 | Yoo et al. | |

FOREIGN PATENT DOCUMENTS

| | | | |
|---|---|---|---|
| KR | 10-2015-0048394 A | 5/2015 | |
| KR | 10-2018-0039224 A | 4/2018 | |

* cited by examiner

*Primary Examiner* — Premal R Patel
(74) *Attorney, Agent, or Firm* — Lewis Roca Rothgerber Christie LLP (57) ABSTRACT

An apparatus for testing a display panel and a driving method thereof. The apparatus includes: a driver for providing a test signal to a display panel; an image sensor for acquiring image data by photographing the display panel on which an image corresponding to the test signal is displayed; a luminance calculator for calculating luminance distribution data, based on the image data; and a compensation data generator for determining a compensation value with respect to pixels of the display panel, based on the luminance distribution data. The driver provides a test signal corresponding to a first gray scale level to a first region including a central portion of the display panel, and provides a test signal corresponding to a second gray scale level different from the first gray scale level to a second region.

20 Claims, 4 Drawing Sheets

APPARATUS FOR TESTING DISPLAY PANEL AND DRIVING METHOD THEREOF

CROSS-REFERENCE TO RELATED APPLICATION

This application claims priority to and the benefit of Korean patent application 10-2018-0073908, filed on Jun. 27, 2018, in the Korean Intellectual Property Office, the entire disclosure of which is incorporated herein by reference.

BACKGROUND

1. Field

The present disclosure generally relates to an apparatus for testing a display panel and a driving method thereof.

2. Description of the Related Art

A luminance variation between pixels may occur due to a characteristic variation of the pixels, a variation in manufacturing processes, and/or the like. For example, there may be a parasitic capacitance variation between transistors, a parasitic capacitance variation between signal lines, and the like, when a thin film pattern is formed to have different widths due to a variation in an exposure amount in a thin film pattern forming process. These variations cause a luminance variation between pixels. Therefore, a spot (e.g., a darker or a brighter spot) may occur in a display panel, and the display quality of the display panel may be deteriorated.

After a display panel is completely manufactured, a screen test of the display panel is performed before the display panel is released as a product. For example, an image of the display panel displaying a test image is photographed through a camera sensor, luminance distribution data of the display panel is calculated utilizing the photographed image, and compensation data is generated based on the luminance distribution data.

However, when an alignment error occurs between the display panel and a camera cell, moire occurs in the photographed image, and therefore, accurate spot compensation (luminance compensation) cannot be performed in the screen test. When the spot compensation is performed utilizing the photographed image in the state in which the moire occurs, the display panel may be determined as a defective product, which may result in reduction of productivity.

SUMMARY

Aspects according to embodiments of the present disclosure are directed toward an apparatus for testing a display panel, which performs spot compensation of the display panel, and a driving method thereof.

Aspects according to embodiments of the present disclosure are directed toward an apparatus for testing a display panel, which reduces an influence of moire (e.g., moiré pattern) in spot compensation of the display panel utilizing image photographing, and a driving method thereof.

According to an embodiment of the present disclosure, an apparatus for testing a display device includes: a driver configured to provide a test signal to the display panel; an image photographing unit (e.g., an image sensor, a camera, etc.) configured to acquire image data by photographing the display panel on which an image corresponding to the test signal is displayed; a luminance calculator configured to calculate luminance distribution data, based on the image data; and a compensation data generator configured to determine a compensation value with respect to pixels of the display panel, based on the luminance distribution data, wherein the driver provides a test signal corresponding to a first gray scale level to a first region including a central region of the display panel, and provides a test signal corresponding to a second gray scale level different from the first gray scale level to a second region.

The second region may include a portion of an edge region of the display panel, and the first region may include the central region of the display panel and an other portion of the edge region.

The second gray scale level may include one or more gray scale levels different from the first gray scale level.

The luminance calculator may make an estimation on luminance distribution data corresponding to the first gray scale level with respect to pixels in the second region, based on luminance distribution data corresponding to the first gray scale level with respect to pixels in the first region adjacent to the second region, and the compensation data generator may determine a compensation value with respect to the pixels in the second region, based on the luminance distribution data corresponding to the first gray scale level.

The compensation data generator may make an estimation on a compensation value with respect to the pixels in the second region, based on a compensation value with respect to the pixels in the first region adjacent to the second region.

The luminance calculator or the compensation data generator may perform the estimation, utilizing two-dimensional (2D) linear interpolation.

The compensation data generator may determine the compensation value with respect to first blocks each including at least one pixel with respect to the central region of the display panel, and determine the compensation value with respect to second blocks each including more number of pixels than that of each of the first blocks with respect to the edge region of the display panel.

The second gray scale level may be a black gray scale level.

The display panel may be a display panel for a Head Mounted Display (HMD).

According to an embodiment of the present disclosure, a method of driving an apparatus for testing a display device includes: providing, by a driver, a test signal to the display panel; acquiring, by an image sensor, image data by photographing the display panel on which an image corresponding to the test signal is displayed; calculating, by a luminance calculator, luminance distribution data, based on the image data; and determining, by a compensation data generator, a compensation value with respect to pixels of the display panel, based on the luminance distribution data, wherein the providing of the test signal includes: providing a test signal corresponding to a first gray scale level to a first region including a central region of the display panel; and providing a test signal corresponding to a second gray scale level different from the first gray scale level to a second region.

The second region may include a portion of an edge region of the display panel, and the first region may include the central region of the display panel and the other portion of the edge region.

The second gray scale level may include one or more gray scale levels different from the first gray scale level.

The calculating of the luminance distribution data may include estimating luminance distribution data corresponding to the first gray scale level with respect to pixels in the second region, based on luminance distribution data corresponding to the first gray scale level with respect to pixels in the first region adjacent to the second region. The determining of the compensation value may include determining the compensation value with respect to the pixels in the second region, based on the luminance distribution data corresponding to the first gray scale level.

The determining of the compensation value may include estimating a compensation value with respect to the pixels in the second region, based on the compensation value with respect to the pixels in the first region adjacent to the second region.

The luminance distribution data corresponding to the first gray scale level with respect to the pixels in the second region or the compensation value with respect to the pixels in the second region may be estimated utilizing 2D linear interpolation.

The determining of the compensation value may include: determining the compensation value with respect to first blocks each including at least one pixel with respect to the central region of the display panel; and determining the compensation value with respect to second blocks each including more number of pixels than each of the first blocks with respect to the edge region of the display panel.

The second gray scale level may be a black gray scale level.

BRIEF DESCRIPTION OF THE DRAWINGS

Example embodiments will now be described more fully hereinafter with reference to the accompanying drawings; however, the present invention may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The enhancements and features of the present invention, and the way of attaining them, will become apparent with reference to embodiments described below in conjunction with the accompanying drawings. However, the present disclosure is not limited to the embodiments but may be implemented into different forms. These embodiments are provided only for illustrative purposes and for full understanding of the scope of the present disclosure by those skilled in the art. Throughout the specification, when an element is referred to as being "connected" or "coupled" to an other element, it can be directly connected or coupled to the other element or be indirectly connected or coupled to the other element with one or more intervening elements interposed therebetween. Like reference numerals refer to like elements throughout the drawings.

Hereinafter, an apparatus for testing a display panel and a driving method thereof will be described with reference to exemplary embodiments in conjunction with the accompanying drawings.

Figure 1:
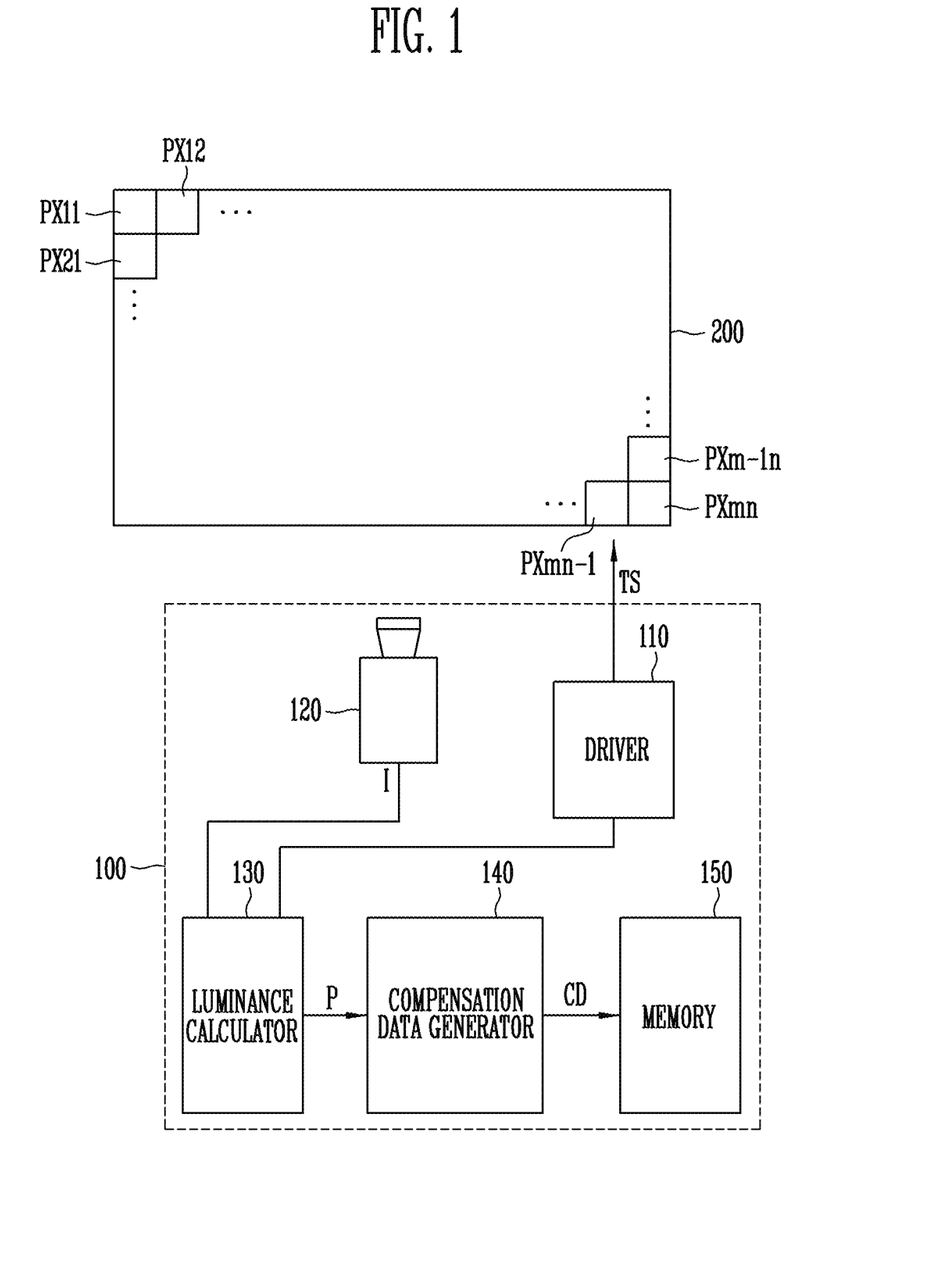
FIG. 1 is a block diagram illustrating a configuration of an apparatus for testing a display panel according to the present disclosure.

FIG. 1 is a block diagram illustrating a configuration of an apparatus for testing a display panel according to an embodiment of the present disclosure.

Referring to FIG. 1, the apparatus 100 for testing a display panel 200 may include a driver 110, an image sensor (e.g., an image photographing unit, an image sensor, a camera, etc.) 120, a luminance calculator 130, a compensation data generator 140, and a memory 150.

The driver 110 provides a test signal TS to the display panel 200. The driver 110 may provide the display panel 200 with test signals TS corresponding to a plurality of preset reference gray scale levels. For example, the driver 110 may sequentially provide the test signals TS respectively corresponding to the plurality of reference gray scale levels to the display panel 200 (e.g., the plurality of reference gray scale levels are provided respectively to a plurality of regions of the display panel 200).

The display panel 200 includes a plurality of pixels PX11 to PXmn arranged in a matrix form. The display panel 200 may display an image corresponding to a reference gray scale level in response to the test signal TS. The display panel 200 may operate at an arbitrary driving frequency, and the driving frequency may be, for example, 60 Hz.

The image sensor 120 may acquire an image by photographing the display panel displaying the image corresponding to the reference gray scale level. The image sensor 120 may include a camera. The image sensor 120 may photograph an image of the display panel 200, and provide image data I of the photographed image to the luminance calculator 130.

The image sensor 120 may be, for example, Charge Coupled Device (CCD) camera, and may be formed with a plurality of camera cells. After the pixels PX11 to PXmn of the display panel 200 and the camera cells of the image sensor 120 are aligned with each other, the image sensor 120 photographs the display panel 200 displaying an image in response to the test signal TS. The image of the display panel 200 may be charged (e.g., captured) as a light signal in each camera cell, and the image sensor 120 may generate image data I by converting the light signal into an electrical signal.

The luminance calculator 130 may calculate luminance distribution data P with respect to the reference gray scale level, based on the image data I. In order to calculate the luminance distribution data P, the luminance calculator 130 may consider exposure time of an image, lens focus characteristics, boundary correction, camera noise, and the like.

The luminance calculator 130 may calculate luminance distribution data P corresponding to a plurality of reference gray scale levels. For example, when luminance distribution data P corresponding to a first reference gray scale level is being calculated, the luminance calculator 130 may control the driver 110 to output a test signal TS corresponding to a second reference gray scale level. Also, when luminance distribution data P corresponding to the second reference gray scale level is being calculated, the luminance calculator 130 may control the driver 110 to output a test signal TS corresponding to a third reference gray scale level.

The compensation data generator 140 calculates compensation values corresponding to the respective pixels PX11 to PXmn, based on the luminance distribution data P corresponding to the plurality of reference gray scale levels. Also, the compensation data generator 140 may generate the compensation values as compensation data CD in the form of a lookup table, and store the compensation data CD in the memory 150. The compensation values constituting the compensation data CD may be values for decreasing a difference between luminance data of a specific pixel and luminance data of the other pixels to be within a threshold range, or values added to or multiplied by a gray scale level value of image data as an input to a display device.

Figure 2:
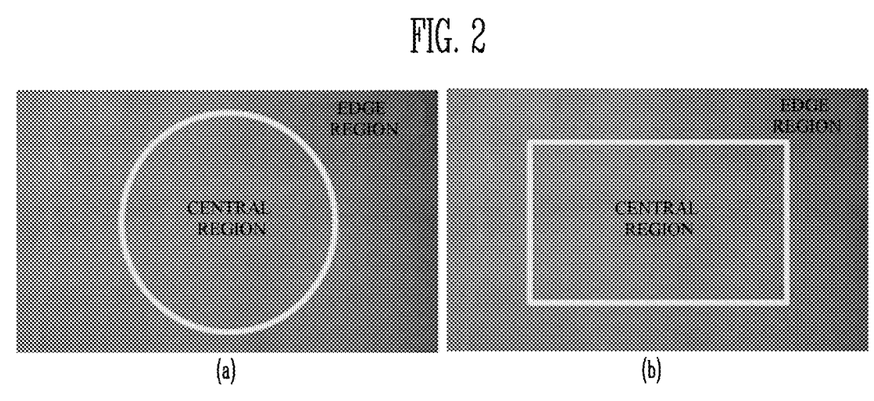
FIG. 2 provides two images (a) and (b) each illustrating a spot compensation method according to an embodiment of the present disclosure.

In various embodiments of the present disclosure, the compensation data generator 140 may generate different compensation data CD for different regions of the display panel 200. Referring to FIG. 2, in some display panels 200, a spot may be easily viewed (e.g., noticed) in a central region of each of the display panels 200, but a spot may not be viewed in an edge region (e.g., a spot in the edge region may not be as visible as in the central region) of each of the display panels 200. For example, in a display panel 200 applied to a Head Mounted Display (HMD), spot visibility is high (e.g., relatively higher) in a central region where a user closely observes through a lens having a specific magnification, and the spot visibility is low (e.g., relatively lower) in an edge region where the user does not closely observe. Nevertheless, when compensation values are calculated with respect to all the pixels PX11 to PXmn and then stored as compensation data CD, the capacity (e.g., storage) occupied by the compensation data CD may be increased in the memory 150, and spot compensation efficiency may be deteriorated.

Therefore, according to embodiments of the present disclosure, the compensation data generator 140 may generate first compensation data CD by utilizing compensation values with respect to first blocks, each including at least one pixel, corresponding to a central region of the display panel 200, and generate second compensation data CD by utilizing compensation values with respect to second blocks, each including pixels of which number is larger than that of pixels of the first block (e.g., each second block includes more number of pixels than each first block), corresponding to an edge region of the display panel 200. In an example embodiment, each of the first blocks may include a single pixel, and each of the second blocks may include two or more pixels. The compensation data generator 140 obtains first compensation data CD by utilizing compensation values with respect to the respective pixels in the first blocks. The central region may have a circular shape (a) or a quadrangular shape (b) as shown in FIG. 2, and the shape and size of the central region are not particularly limited. Accordingly, the capacity occupied by the compensation data in the memory 150 is decreased, and spot compensation can be more efficiently performed.

Figure 3:
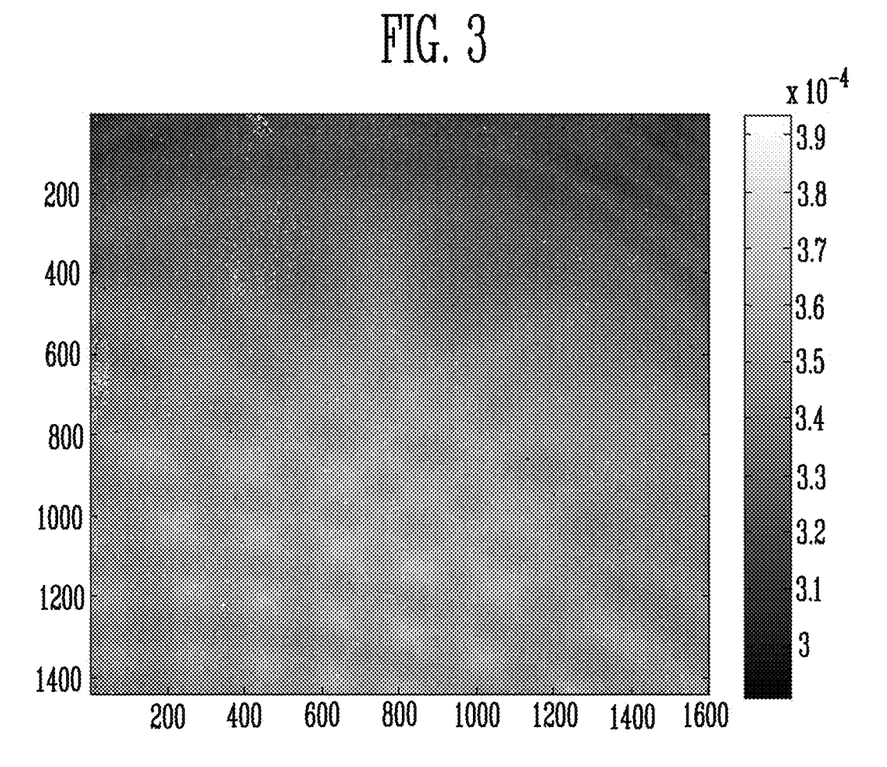
FIG. 3 is a diagram illustrating moire occurring in image photographing.

In the apparatus 100 described above, moire may occur in an image photographed by the image sensor 120 as shown in FIG. 3. The moire may occur when the pixels PX11 to PXmn of the display panel 200 and the camera cells of the image sensor 120 are not correctly aligned with each other. Therefore, the moire may occur with a higher probability in a high Pixel Per Inch (PPI) (e.g., 1000 PPI or more) display panel in which a large number of pixels are disposed in a narrow area. For example, PPI is very high in the display panel applied to the above-described HMD, and hence the moire may occur more seriously.

When compensation data is generated utilizing image data I in which moire occurs, the moire occurs (e.g., is shown) in an image of the display panel 200, which is then compensated utilizing the corresponding compensation data CD, which may result in reduction of productivity because the display panel may be determined as a defective product. A method of photographing the display panel 200 through focus blur processing may be utilized so as to reduce the influence of moire, but this makes it difficult to perform accurate spot compensation.

In various embodiments of the present disclosure, there are provided an apparatus for testing a display panel, which reduces the influence of moire occurring in a photographed image, and a driving method thereof.

According to various embodiments of the present disclosure, the driver 110 may provide a test signal TS corresponding to a first gray scale level to a first region including a central portion (e.g., central region) on the display panel 200, and provide a test signal TS corresponding to a second gray scale level different from the first gray scale level to a second region on the display panel 200. The first gray scale level may be, for example, a reference gray scale level, and the second gray scale level may be, for example, a black gray scale level. In an embodiment, the driver 110 may provide the second region with test signals TS corresponding to a plurality of gray scale levels as the second gray scale level different from the first gray scale level.

When an image representing a plurality of gray scale levels is photographed, an influence of moire in the image may be reduced as compared with when an image representing a single gray scale level is photographed. When the camera cells of the image sensor 120 receive light signals from the respective pixels of the display panel 200, light signals corresponding to a plurality of different gray scale levels cause mutual interference, and consequently, moire caused by misalignment between the camera cells and the pixels can be cancelled out. Thus, the driver 110 according to the present disclosure provides a test signal TS to the display panel 200 such that an image corresponding to the first gray scale level is displayed in the first region and an image corresponding to the second gray scale level is displayed in the second region.

The position, size, and shape of the second region are determined such that moire is cancelled out (removed) when the display panel 200 is photographed, and may be determined experimentally or through moire simulations. A specific determination method is not particularly limited. In an example, the position, size, and shape of the second region may be determined when (e.g., when it is determined that) moire hardly occurs or does not occur in a photographed image while the second gray scale level is being displayed in a region having various position, sizes, and shapes on the display panel 200 and the first gray scale level is being displayed in the other region on the display panel 200.

Figure 4:
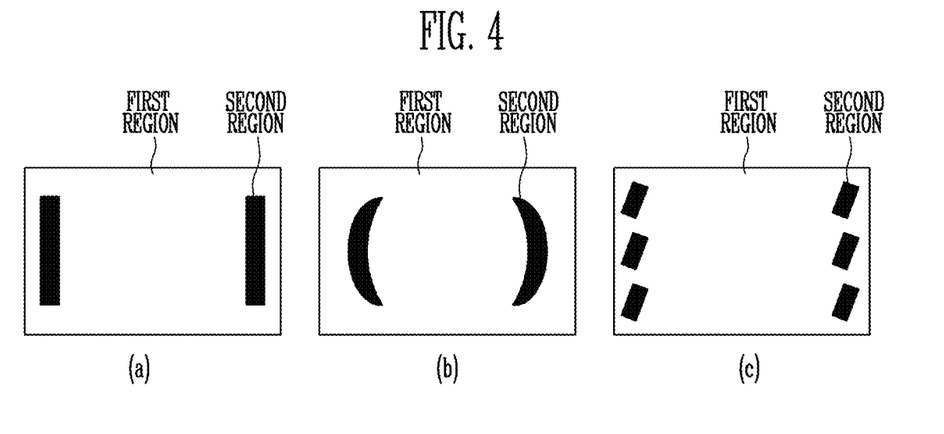
FIG. 4 provides examples (a), (b), and (c) each illustrating a second region configured according to an embodiment of the present disclosure.

In an example embodiment, the second region may be formed to have various position, sizes, and shapes as shown in (a) to (c) of FIG. 4. The second region may be configured with (e.g., may include) a plurality of discontinuous regions. Although examples in which a test signal TS corresponding to a single gray scale level are provided to the second region is illustrated in FIG. 4, it will be apparent that test signals TS corresponding to a plurality of gray scale levels may be provided to the second region (e.g., different gray scale levels may be provided respectively to the plurality of discontinuous regions in the second region).

In various embodiments of the present disclosure, the second region may be a portion of the edge region of the display panel 200. As will be described later, relatively inaccurate spot compensation may be performed (and accepted) on the second region representing a gray scale level instead of the reference gray scale level, as compared with the first region. Therefore, the second region may be set in an edge region having relatively low spot visibility as described above. Accordingly, the first region includes the central region and the other portion of the edge region on the display panel 200.

The display panel displays an image corresponding to the first gray scale level in the first region and displays an image corresponding to the second gray scale level in the second region, in response to the test signal TS. An arbitrary pattern may be formed on the display panel 200 according to the size and shape of the second region. Hereinafter, this pattern is referred to as a moire cancellation pattern. The moire cancellation pattern may have various shapes as shown in (a) to (c) of FIG. 4. Although an example embodiment in which the moire cancellation pattern is configured with a single gray scale level is illustrated in FIG. 4, the moire cancellation pattern may be configured with a plurality of gray scale levels as described above.

In various embodiments of the present disclosure, the moire cancellation pattern may be provided in plurality. Different moire patterns may be formed according to characteristics of the display panel 200, e.g., PPI, and different moire cancellation patterns may be set corresponding to the characteristics of the display panel 200.

As the above-described moire cancellation pattern is displayed on the display panel 200, a first gray scale level and a second gray scale level are respectively represented in the first region and the second region of an image photographed by the image sensor 120. As an image in which a plurality of gray scale levels are mixed together is photographed, a moire pattern in the photographed image may be cancelled out (e.g., at least cancelled out). The luminance calculator 130 may calculate luminance distribution data P from the image from which moire is removed, and the compensation data generator 140 may calculate compensation values corresponding to the pixels PX11 to PXmn, based on the luminance distribution data P.

In various embodiments of the present disclosure, the compensation data generator 140 may calculate compensation values with respect to pixels in the first region, based on luminance distribution data P corresponding to the first gray scale level with respect to the first region. In an embodiment, the compensation data generator 140 may calculate compensation values respectively corresponding to pixels with respect to the central region of the display panel 200 in the first region, and calculate compensation values respectively corresponding to blocks with respect to the edge region of the display panel 200 in the first region (e.g., the compensation data generator 140 may calculate compensation values for pixels in the first region that are located in the central region of the display panel 200, and for blocks in the edge region of the display panel 200 that belong to the first region respectively).

Meanwhile, the compensation data generator 140 may calculate compensation values corresponding to pixels in the second region, based on the luminance distribution data P of the first region or the compensation values of the first region with respect to the second region. This will be described in more detail as follows.

Figure 5:
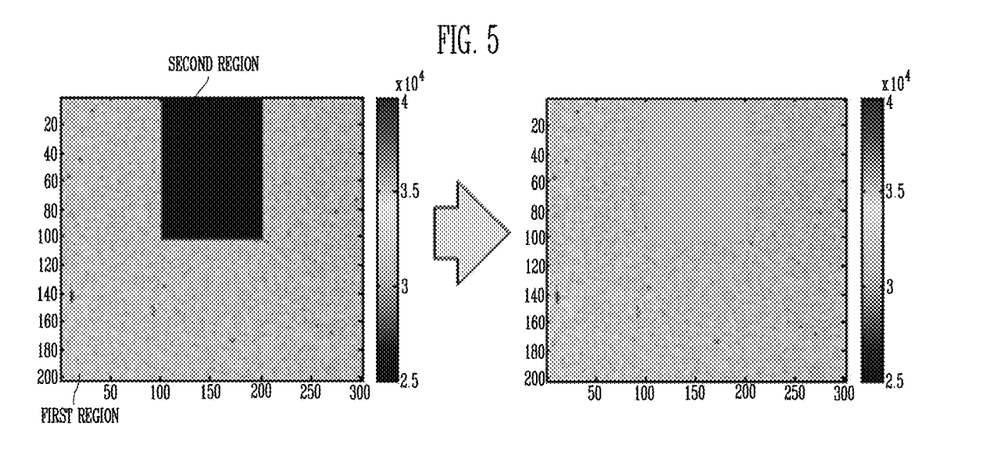
FIG. 5 is a diagram illustrating a calculating method of luminance distribution data corresponding to a first gray scale level with respect to the second region according to an embodiment of the present disclosure.

In a first embodiment of the present disclosure, as shown in FIG. 5, the compensation data generator 140 may estimate luminance distribution data P corresponding to the first gray scale level with respect to pixels in the second region from luminance distribution data P with respect to pixels in the first region adjacent to the second region. Two-dimensional (2D) linear interpolation may be applied to estimate the luminance distribution data P corresponding to the first gray scale level with respect to the pixels in the second region. When luminance distribution data P corresponding to the first gray scale level with respect to the pixels in the second region is estimated as shown in the drawing on the right side of FIG. 5, the compensation data generator 140 may calculate compensation values with respect to the pixels in the second region, based on the luminance distribution data P corresponding to the first gray scale level. In various embodiments, when the second region is a portion of the edge region, the compensation data generator 140 may calculate compensation values in units of blocks with respect to the second region.

The estimation of luminance distribution data P may also be performed by the luminance calculator 130. The luminance calculator 130 may estimate luminance distribution data P corresponding to the first gray scale level with respect to the pixels in the second region, and transfer, to the compensation data generator 140, luminance distribution data P corresponding to the first gray scale level with respect to all the pixels of the display panel 200. The compensation data generator 140 may calculate compensation values with respect to the pixels constituting the display panel 200, based on the luminance distribution data P corresponding to the first gray scale level.

Meanwhile, in a second embodiment of the present disclosure, the compensation data generator 140 may estimate compensation values with respect to the pixels in the second region from compensation values with respect to the pixels in the first region adjacent to the second region. The 2D linear interpolation may be applied to estimate the compensation values with respect to the pixels in the second region. In various embodiments, when the second region is a portion of the edge region, the compensation data generator 140 may estimate compensation values in units of blocks with respect to the second region.

The compensation data generator 140 may generate compensation data CD, based on the compensation values, and store the compensation data CD in the memory 150.

Accordingly, the apparatus 100 removes an influence of moire with respect to a photographed image of the display panel 200, and perform high-accuracy spot compensation. Thus, the probability that a defect may occur in the display panel 200 can be reduced, and the product yield of the display panel 200 can be improved.

Figure 6:
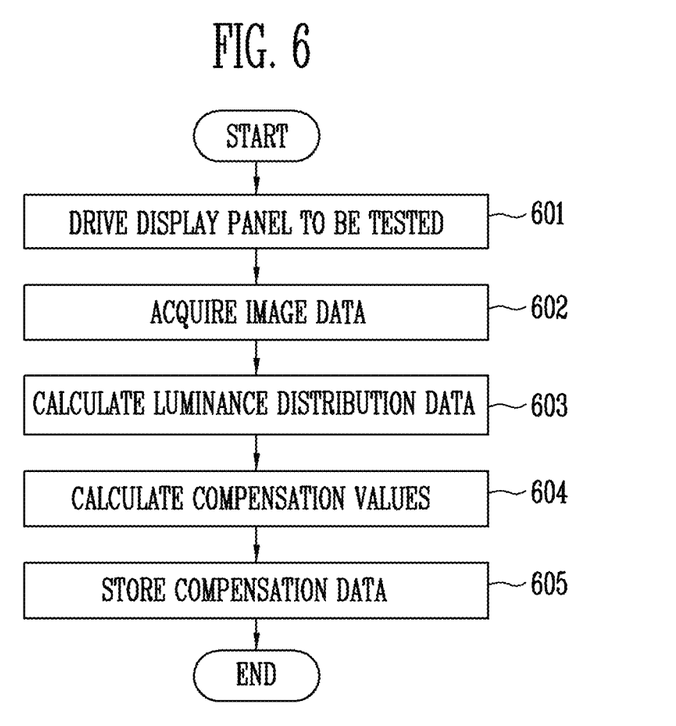
FIG. 6 is a flowchart illustrating a driving method of the apparatus according to the present disclosure.

FIG. 6 is a flowchart illustrating a driving method of the apparatus according to the present disclosure.

Referring to FIG. 6, first, the apparatus 100 according to the present disclosure drives a display panel to be tested (601). For example, the driver 110 may drive the display panel by providing a preset test signal TS to the display panel 200 to be tested.

In various embodiments of the present disclosure, the driver 110 may provide a test signal TS corresponding to a first gray scale level to a first region including a central portion on the display panel 200, and provide a test signal TS corresponding to a second gray scale level different from the first gray scale level to a second region. In an embodiment, the driver 110 may provide the second region with test signals TS corresponding to a plurality of gray scale levels different from the first gray scale level.

The position, size, and shape of the second region may be determined experimentally or through moire simulations such that moire is cancelled out when the display panel 200 is photographed. In various embodiments, the second region may be a portion of an edge region of the display panel 200.

An image corresponding to the first gray scale level may be displayed on the first region of the display panel 200 to be tested in response to the test signal TS, and an image corresponding to the second gray scale level may be displayed on the second region of the display panel 200 to be tested in response to the test signal TS.

Next, the apparatus 100 acquires image data I with respect to the driven display panel 200 to be tested (602). For example, the image sensor 120 acquires image data I by photographing an image displayed on the display panel 200 to be tested. The image sensor 120 may transfer the acquired image data I to the luminance calculator 130.

Next, the apparatus 100 calculates luminance distribution data P, based on the acquired image data I (603). For example, the luminance calculator 130 may calculate luminance distribution data P corresponding to the first gray scale level with respect to pixels in the first region, and calculate luminance distribution data P corresponding to the second gray scale level with respect to pixels in the second region. In an embodiment, the luminance calculator 130 may calculate luminance distribution data P corresponding to the first gray scale level with response to pixels in the second region by applying 2D linear interpolation to luminance distribution data P with respect to pixels in the first region adjacent to the second region.

Next, the apparatus 100 calculates compensation values with respect to pixels, based on the luminance distribution data P (604). For example, as for the first region, the compensation data generator 140 may calculate compensation values with respect to the pixels in the first region, based on the luminance distribution data P corresponding to the first gray scale level. In an embodiment, the compensation data generator 140 may calculate compensation values respectively corresponding to first blocks each including at least one pixel with respect to a central region of the display panel 200 in the first region, and calculate compensation values respectively corresponding to second blocks each including pixels of which number is larger than that of pixels of the first block (e.g., each of the second blocks include more number of pixels than each of the first blocks) with respect to the edge region of the display panel 200 in the first region.

Meanwhile, as for the second region, the compensation data generator 140 may calculate compensation values corresponding to the pixels in the second region, based on the luminance distribution data P of the first region or the compensation values of the first region.

Finally (e.g., lastly), the apparatus 100 stores the calculated compensation values as compensation data CD in the memory 150 (605).

In the apparatus and a driving method thereof according to the present disclosure, an influence of moire caused by misalignment between the display panel and the camera cell can be reduced or minimized when an image of the display panel is photographed so as to (e.g., more accurately) test the display panel.

Further, in the apparatus and a driving method thereof according to the present disclosure, high-accuracy spot compensation can be performed utilizing image photographing. Accordingly, the probability that a defect will occur in the display panel can be reduced, and the product yield of the display panel can be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the present disclosure as set forth in the following claims, and equivalents thereof.

What is claimed is:

1. An apparatus for testing a display panel, the apparatus comprising:
a driver configured to provide a test signal to the display panel;
an image sensor configured to acquire image data by photographing the display panel on which an image corresponding to the test signal is displayed;
a luminance calculator configured to calculate luminance distribution data, based on the image data; and
a compensation data generator configured to determine a compensation value with respect to pixels of the display panel, based on the luminance distribution data,
wherein the driver is configured to provide a test signal corresponding to a first gray scale level to a first region comprising a central region of the display panel, and provide a test signal corresponding to a second gray scale level different from the first gray scale level to a second region,
wherein the second region comprises a plurality of discontinuous regions of the display panel arranged adjacent to the first region,
wherein the first region is a single region provided in the display panel, and
wherein the plurality of discontinuous regions are provided only in an edge region of the display panel and are not provided at the central region of the display panel.

2. The apparatus of claim 1, wherein
the first region comprises the central region of the display panel and an other portion of the edge region.

3. The apparatus of claim 2, wherein the compensation data generator is configured to determine a compensation value with respect to first blocks each comprising at least one pixel with respect to the central region of the display panel, and to determine a compensation value with respect to second blocks each comprising more number of pixels than each of the first blocks with respect to the edge region of the display panel.

4. The apparatus of claim 1, wherein the second gray scale level comprises one or more gray scale levels each being different from the first gray scale level.

5. The apparatus of claim 1, wherein the luminance calculator is configured to estimate luminance distribution data corresponding to the first gray scale level with respect to pixels in the second region, based on luminance distribution data corresponding to the first gray scale level with respect to pixels in the first region adjacent to the second region, and the compensation data generator is configured to determine a compensation value with respect to pixels in the second region, based on the luminance distribution data corresponding to the first gray scale level.

6. The apparatus of claim 5, wherein the luminance calculator is configured to perform the estimate, utilizing two-dimensional (2D) linear interpolation.

7. The apparatus of claim 1, wherein the compensation data generator is configured to estimate a compensation value with respect to pixels in the second region, based on a compensation value with respect to pixels in the first region adjacent to the second region.

8. The apparatus of claim 7, wherein the compensation data generator is configured to perform the estimate, utilizing two-dimensional (2D) linear interpolation.

9. The apparatus of claim 1, wherein the second gray scale level is a black gray scale level.

10. The apparatus of claim 1, wherein the display panel is a display panel for a Head Mounted Display (HMD).

11. A method of driving an apparatus for testing a display panel, the method comprising:
providing, by a driver, a test signal to the display panel;
acquiring, by an image sensor, image data by photographing the display panel on which an image corresponding to the test signal is displayed;
calculating, by a luminance calculator, luminance distribution data, based on the image data; and
determining, by a compensation data generator, a compensation value with respect to pixels of the display panel, based on the luminance distribution data,
wherein the providing of the test signal comprises:
providing a test signal corresponding to a first gray scale level to a first region comprising a central region of the display panel; and
providing a test signal corresponding to a second gray scale level different from the first gray scale level to a second region,
wherein the second region comprises a plurality of discontinuous regions of the display panel arranged adjacent to the first region,
wherein the first region is a single region provided in the display panel, and
wherein the plurality of discontinuous regions are provided only in an edge region of the display panel and are not provided at the central region of the display panel.

12. The method of claim 11, wherein
the first region comprises the central region of the display panel and an other portion of the edge region.

13. The method of claim 12, wherein the determining of the compensation value comprises:
determining a compensation value with respect to first blocks each comprising at least one pixel with respect to the central region of the display panel; and
determining a compensation value with respect to second blocks each comprising more number of pixels than each of the first blocks with respect to the edge region of the display panel.

14. The method of claim 11, wherein the second gray scale level comprises one or more gray scale levels each different from the first gray scale level.

15. The method of claim 11, wherein the calculating of the luminance distribution data comprises estimating luminance distribution data corresponding to the first gray scale level with respect to pixels in the second region, based on luminance distribution data corresponding to the first gray scale level with respect to pixels in the first region adjacent to the second region,
wherein the determining of the compensation value comprises determining a compensation value with respect to pixels in the second region, based on the luminance distribution data corresponding to the first gray scale level.

16. The method of claim 15, wherein the luminance distribution data corresponding to the first gray scale level with respect to pixels in the second region is estimated utilizing 2D linear interpolation.

17. The method of claim 11, wherein the determining of the compensation value comprises estimating a compensation value with respect to pixels in the second region, based on a compensation value with respect to pixels in the first region adjacent to the second region.

18. The method of claim 17, wherein the compensation value with respect to pixels in the second region is estimated utilizing 2D linear interpolation.

19. The method of claim 11, wherein the second gray scale level is a black gray scale level.

20. A system of driving an apparatus for testing a display panel, the system comprising:
means for providing, by a driver, a test signal to the display panel;
means for acquiring, by an image sensor, image data by photographing the display panel on which an image corresponding to the test signal is displayed;
means for calculating, by a luminance calculator, luminance distribution data, based on the image data; and
means for determining, by a compensation data generator, a compensation value with respect to pixels of the display panel, based on the luminance distribution data,
wherein the providing of the test signal comprises:
providing a test signal corresponding to a first gray scale level to a first region comprising a central region of the display panel; and
providing a test signal corresponding to a second gray scale level different from the first gray scale level to a second region,
wherein the second region comprises a plurality of discontinuous regions of the display panel arranged adjacent to the first region,
wherein the first region is a single region provided in the display panel, and
wherein the plurality of discontinuous regions are provided only in an edge region of the display panel and are not provided at the central region of the display panel.

* * * * *